United States Patent [19]

Echigo et al.

[11] Patent Number: 5,342,668
[45] Date of Patent: Aug. 30, 1994

[54] MAGNETIC RECORDING MEDIUM HAVING IMPROVED ELECTROMAGNETIC CONVERSION CHARACTERISTICS AND DURABILITY

[75] Inventors: Fumio Echigo; Masahiro Saida; Naoko N. F. Mizuno; Hideo Hatanaka; Yoshio Enoki, all of Osaka, Japan

[73] Assignee: Matsushita Electric Industrial Co., Ltd., Osaka, Japan

[21] Appl. No.: 690,489

[22] Filed: Apr. 24, 1991

[30] Foreign Application Priority Data

Apr. 24, 1990 [JP] Japan ................. 2-108415

[51] Int. Cl.$^5$ .............. B32B 3/02; B32B 5/16; G11B 5/66
[52] U.S. Cl. .................. 428/64; 428/323; 428/329; 428/694 B; 428/694 BN; 428/694 BA; 428/694 BM
[58] Field of Search .......... 428/694, 329, 900, 64, 428/323, 684 B, 684 BN, 684 BA, 684 BM

[56] References Cited

U.S. PATENT DOCUMENTS

| | | | |
|---|---|---|---|
| 4,015,042 | 3/1977 | Chassaigne | 428/325 |
| 4,336,308 | 6/1982 | Yamada et al. | 428/425.3 |
| 4,405,481 | 9/1983 | Yamada et al. | 252/62.54 |
| 4,687,704 | 8/1987 | Miyoshi et al. | 428/328 |
| 5,093,172 | 3/1992 | Kato et al. | 428/64 |

FOREIGN PATENT DOCUMENTS

| | | |
|---|---|---|
| 57-49967 | 10/1982 | Japan . |
| 57-49969 | 10/1982 | Japan . |
| 60-5421 | 1/1985 | Japan . |
| 60-7614 | 1/1985 | Japan . |
| 61-73240 | 4/1986 | Japan . |
| 1-260626 | 10/1989 | Japan . |

Primary Examiner—Paul J. Thibodeau
Assistant Examiner—Leszek Kiliman
Attorney, Agent, or Firm—Lowe, Price, LeBlanc & Becker

[57] ABSTRACT

A magnetic recording medium which comprises a support and a magnetic layer formed on opposite sides of the support and comprised of a ferromagnetic fine powder and an non-magnetic powder of an abrasive both dispersed in a resin binder. The non-magnetic powder consists essentially of a first non-magnetic inorganic powder having an average particle size of from 0.01 to 1.0 μm and a second non-magnetic inorganic powder having an arborescent or chain-like structure and an average particle size of from 0.03 to 2.0 μm. The first and second powders is present at a mixing ratio by weight of 8:2 to 2:8.

3 Claims, 7 Drawing Sheets

M

M 1.0 μm 1.0 μm ic recording medium using ferromagnetic fine powder which is improved in electromagnetic conversion characteristics and durability. The invention is particularly suitable for a disk-shaped magnetic recording medium.

MAGNETIC RECORDING MEDIUM HAVING IMPROVED ELECTROMAGNETIC CONVERSION CHARACTERISTICS AND DURABILITY

BACKGROUND OF THE INVENTION

1. Field of the Invention

This invention relates to the art of magnetic recording and more particularly, to a magnetic recording medium using ferromagnetic fine powder which is improved in electromagnetic conversion characteristics and durability. The invention is particularly suitable for a disk-shaped magnetic recording medium.

2. Description of the Prior Art

Magnetic recording mediums such as audio tapes, tapes for video tape recorders, magnetic sheets, coating-type magnetic disks and the like have a yearly tendency toward a higher recording density and a shorter wavelength in recording signals. With coating-type magnetic recording mediums, ferromagnetic powder dispersed in the magnetic recording layer becomes finer in size and higher in packing density, thereby improving electromagnetic conversion characteristics as is known in the art. This eventually leads to a very smooth surface of the magnetic recording medium. The smoothness results in an increase in contact area between the medium and a magnetic head with an increasing friction coefficient. Thus, the medium is more liable to be degraded than known mediums with respect to the runnability and durability and the wear resistance of the magnetic layer.

In order to improve the film strength of the magnetic recording medium and to obtain an appropriate effect of cleaning the magnetic head, there has been hitherto proposed the use of non-magnetic inorganic powders with a relatively high hardness in the magnetic layer such as, for example, $\alpha$—$Al_2O_3$, $Cr_2O_3$, $\alpha$—$Fe_2O_3$, $TiO_2$ and the like, with or without use of solid or liquid lubricants in combination. The use of such inorganic powders as an abrasive material is described, for example, in Japanese Patent Publication Nos. 57-49967 and 57-49969 and Japanese Kokai Nos. 60-5421, 60-7614 and 61-73240.

Efforts have been made for the high degree of packing or filling of the magnetic powder in the magnetic layer so as to meet the demand for the high density recording. This inevitably requires a reduction in amount of the abrasive, making it difficult to properly balance the electromagnetic conversion characteristics and the durability.

On the other hand, there has been proposed, for example, in Japanese Kokai No. 1-260626, a magnetic recording medium which makes use of an abrasive having an arborescent or chain-like structure in order to make a great surface roughness in small amounts. For the surface roughness which is so suppressed that little or no influence is produced on the electromagnetic conversion characteristics, the amount of the abrasive has to be reduced with an undesirable lowering of the film strength. Thus, satisfactory durability cannot be expected.

SUMMARY OF THE INVENTION

It is accordingly an object of the invention to provide a coating-type magnetic recording medium which has well-balanced in electromagnetic conversion characteristics and durability.

It is another object of the invention to provide a coating-type, disk-shaped magnetic recording medium having a magnetic layer on opposite sides of the medium wherein a magnetic powder is filled in a high degree with an improved mechanical strength of the layers and which has a controlled surface roughness.

The above objects can be achieved, according to the invention, by a magnetic recording medium which comprises a support and a magnetic layer formed on opposite sides of the support and comprised of a ferromagnetic fine powder and an non-magnetic powder of an abrasive both dispersed in a resin binder. The invention is characterized in that the non-magnetic powder consists essentially of a first non-magnetic inorganic powder having an average particle size of from 0.01 to 1.0 $\mu$m and a second non-magnetic inorganic powder having an arborescent or chain-like structure and an average particle size of from 0.03 to 2.0 $\mu$m provided that the size of the first powder is smaller than the size of the second powder within the respective ranges. The first and second powders are used in an amount of 8:2 to 2:8 on the weight basis. The first powder has a primary particle structure and the second powder has a secondary particle structure in the form of aborescence or chains.

In the above arrangement, the surface roughness of the magnetic layer is predominantly determined by the second abrasive powder having the arborescent structure. As set out before, if the surface roughness is controlled in an appropriate degree by the addition of the powder having the arborescent structure, the durability or physical strength of the layer becomes unsatisfactory. The deficiency of the physical strength is filled up with the first powder of the primary particles with a smaller particle size. The first powder will be filled in spaces or interstices which will be established with the larger-size second particles. The combination of the first and second abrasive powders enables one to design intended surface roughness and film strength in controlled amounts of the powders. This makes it possible to fill the powders in high degrees since any additional abrasive is not used in the magnetic recording layer. Thus, the resulting magnetic recording medium will have good electromagnetic conversion characteristics and high durability.

Since the surface roughness of the magnetic layer can be arbitrarily controlled, wide utility of the combination of the first and second powders will be expected in the fields of recording mediums.

DETAILED DESCRIPTION AND EMBODIMENTS OF THE INVENTION

Figure 1:
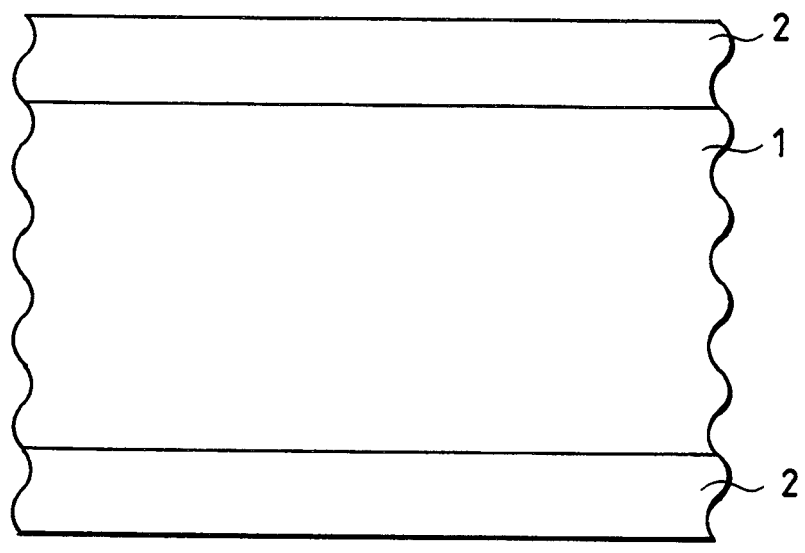
FIG. 1 is a schematic side view of a disk-shaped magnetic recording medium according to one embodiment of the invention.
Figure 2A:
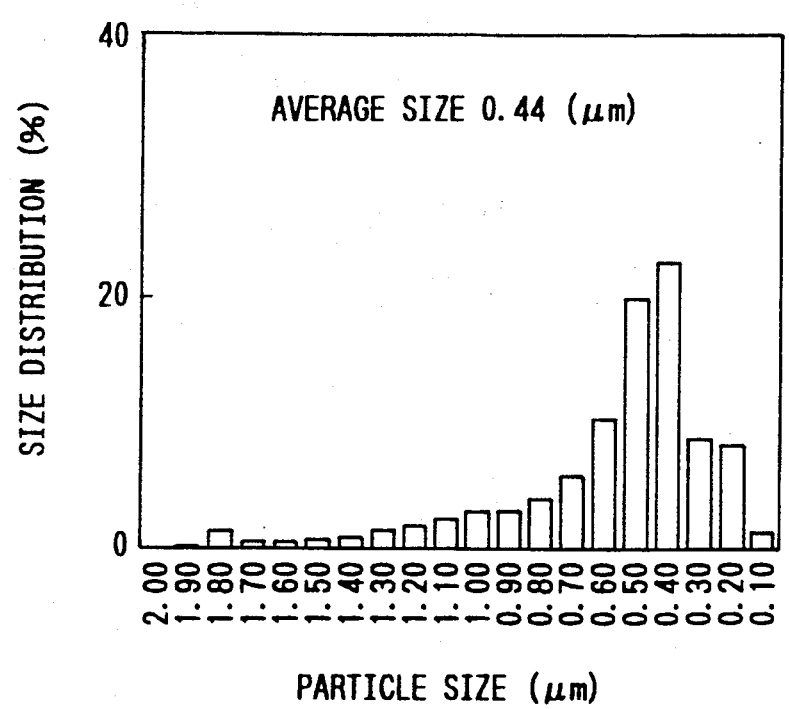
FIGS. 2 to 4 are, respectively, size distributions of alumina pastes prepared in Examples 1 to 3.
Figure 2B:
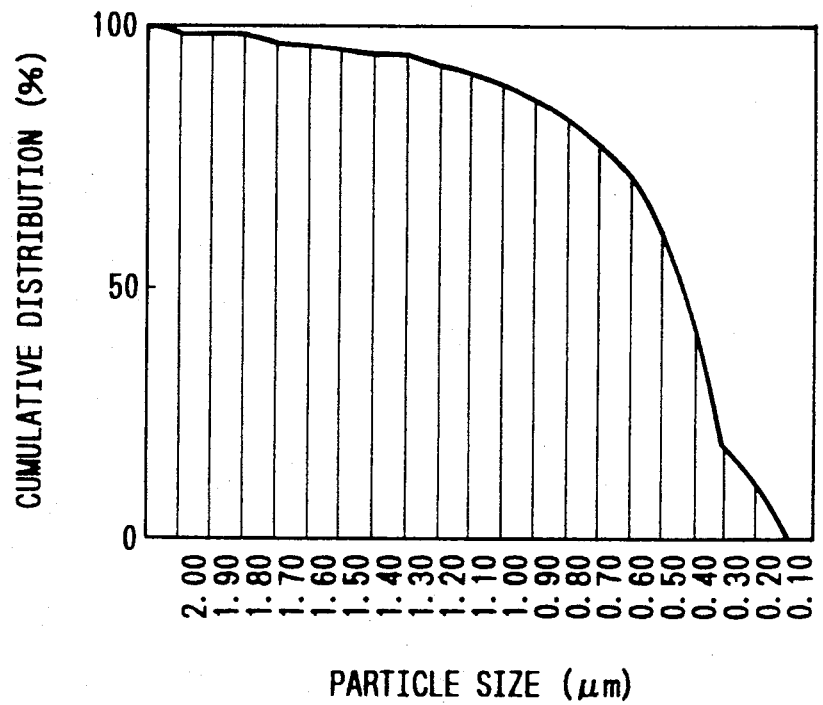
Figure 3A:
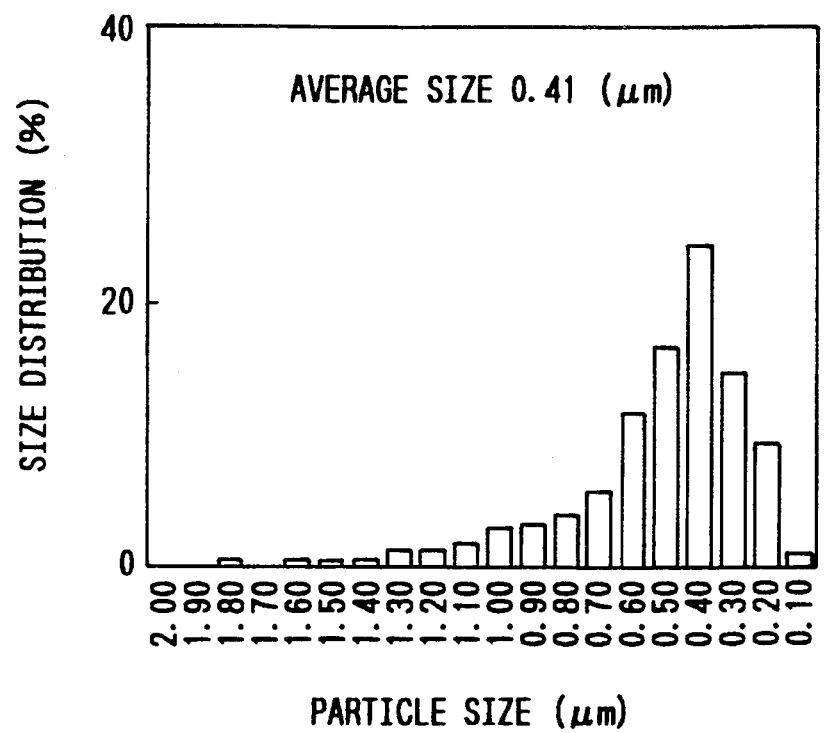
Figure 3B:
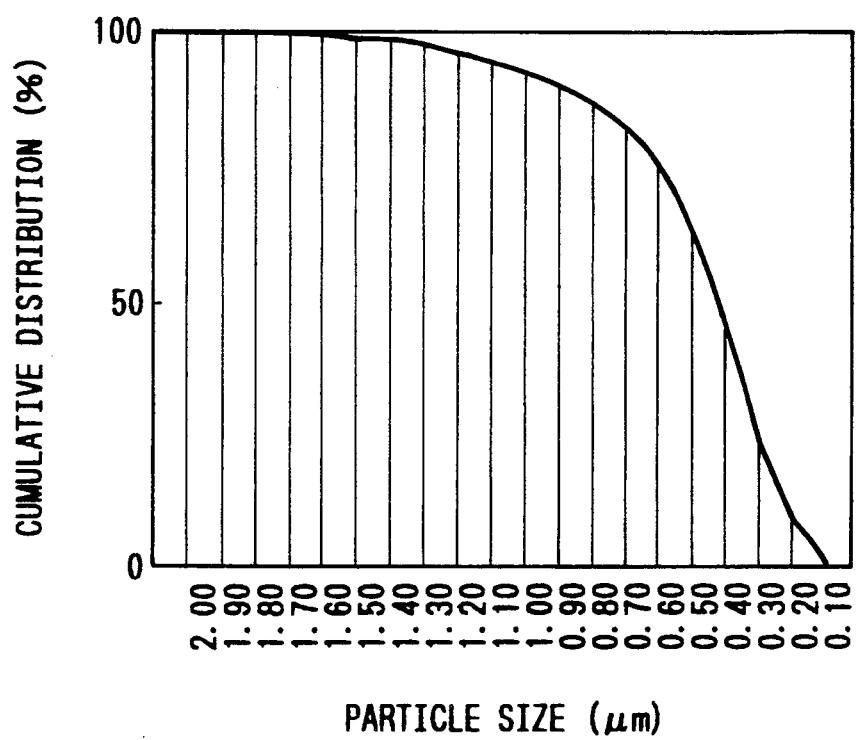
Figure 4A:
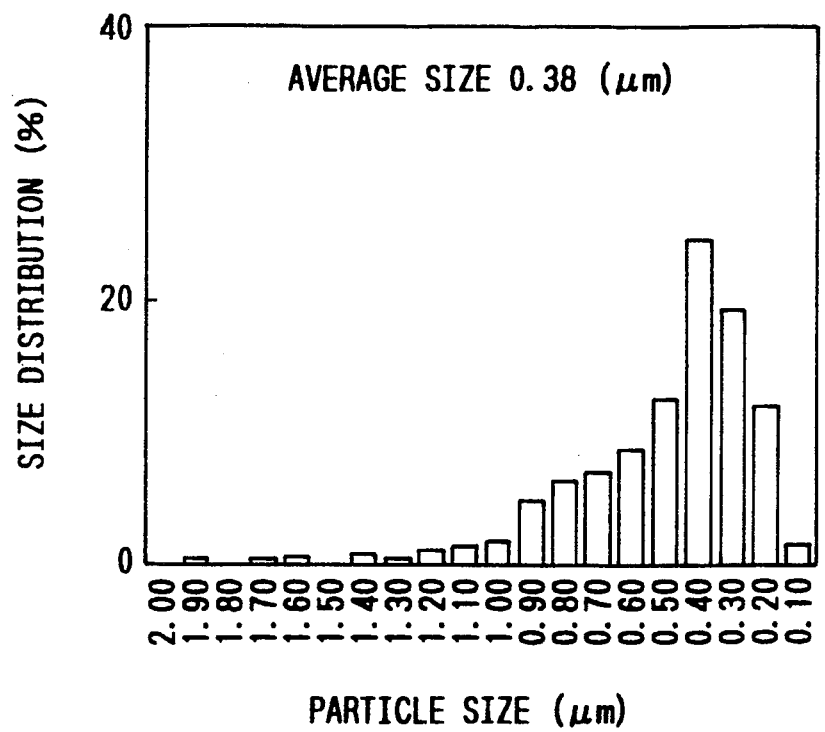
Figure 4B:
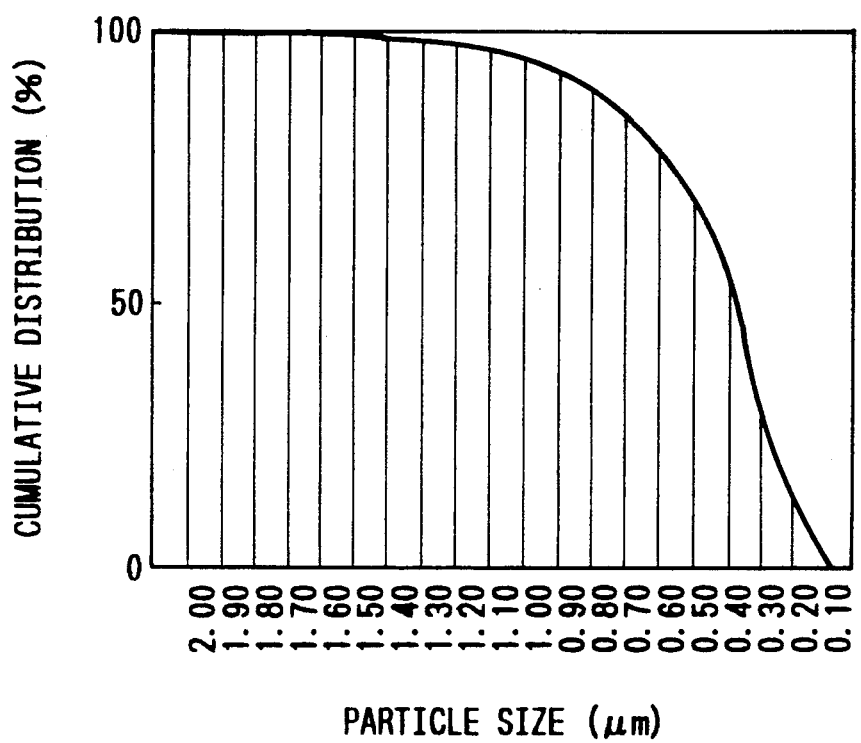

Reference is now made to the accompanying drawings and particularly, to FIG. 1 in which there is schematically shown a magnetic recording medium M. The medium M includes a non-magnetic support 1 and magnetic layers 2,2 formed on opposite sides of the support 1. The medium M shown is disk-shaped and the magnetic layers 2,2 are provided on opposite sides in the practice of the invention, but the magnetic layer may be provided on one side of the medium M, if necessary.

The non-magnetic support 1 may be in the form of a film, sheet, plate or the like and may be made of any resin ordinarily used for this purpose. Examples of the resin include, for example, cellulose diacetate, cellulose triacetate, polyvinyl chloride, polyethylene terephthalate, polyethylene naphthylate, polycarbonates, polyamides, polyimides and the like.

The magnetic layer or layers 2,2 are made of a composition which comprises a ferromagnetic fine powder having a size of from 0.1 to 0.8 $\mu m$ and a non-magnetic inorganic powder having a Mohs hardness of not less than 6, both dispersed uniformly in a resin binder. Examples of the ferromagnetic powder include those of Co-$\gamma$-iron oxide, pure iron, barium ferrites and the like. Examples of the non-magnetic inorganic powder include alumina, chromium oxide such as $Cr_2O_3$, $\alpha$—$Fe_2O_3$, titanium oxide such as $TiO_2$ and the like. The resin binders include, for example, vinyl chloride-vinyl acetate copolymers, nitro cellulose, polyurethane resins, polyester resins, low molecular weight isocyanate compounds and the like, used singly or in combination.

The total of the ferromagnetic powder and the non-magnetic inorganic powder is generally present in the range of from 180 to 250 wt % based on the binder.

As a matter of course, additives such as lubricants may be added to the magnetic composition. Examples of the additive and the lubricant include carbon black, fatty acids, fatty acid esters, phosphoric esters, fluorine-containing hydrocarbons and the like.

As stated before, the present invention is characterized in that the non-magnetic inorganic powder consists essentially of two types of powders, one being primary particles and the other being secondary particles having an arborescent or chain-like structure composed of a plurality of primary particles. In the practice of the invention, the two types of powders should preferably be both made of a metal oxide such as alumina, chromium oxide, titanium oxide or $\alpha$—$Fe_2O_3$. The primary particles of these oxides may be prepared by any known technique and are available, for example, from Sumitomo Chemical Ind. Co., Ltd. under the designation of AKP-30, Toso Co., Ltd., and the like. The primary particles of the respective oxides should have an average particle size of from 0.01 to 1.0 $\mu m$.

The secondary particles of the respective oxides having the arborescent or chain-like structure are available, for example, from Sumitomo Chemical Ind. Co., Ltd. under the designation of AKP 3020. The secondary particles should have an average particle size of from 0.03 to 2.0 $\mu m$ provided that within this range, the secondary particles should be larger in size than the primary particles when used in practical applications. This permits the primary particles to be at least partially included within the secondary particles.

The total amount of the first and second non-magnetic inorganic powders is in the range of from 5 to 25 wt % based on the ferromagnetic powder used.

For the formation of the magnetic recording layer, the magnetic composition comprising a ferromagnetic powder, a non-magnetic inorganic powder and a binder is dispersed in a solvent for the resin such as methyl ethyl ketone, methyl isobutyl ketone, toluene, xylene, cyclohexanone, acetone or mixtures thereof by dispersing means such as a ball mill, a sand moll, a pebble mill or the like mill. The resultant paint is applied onto the support and dried by a usual manner, followed by calendering to obtain a magnetic recording medium.

Figure 5:
FIG. 5 is a schematic enlarged view of an abrasive powder having an arborescent or chain-like structure formed by combining a plurality of primary particles together.
Figure 6:
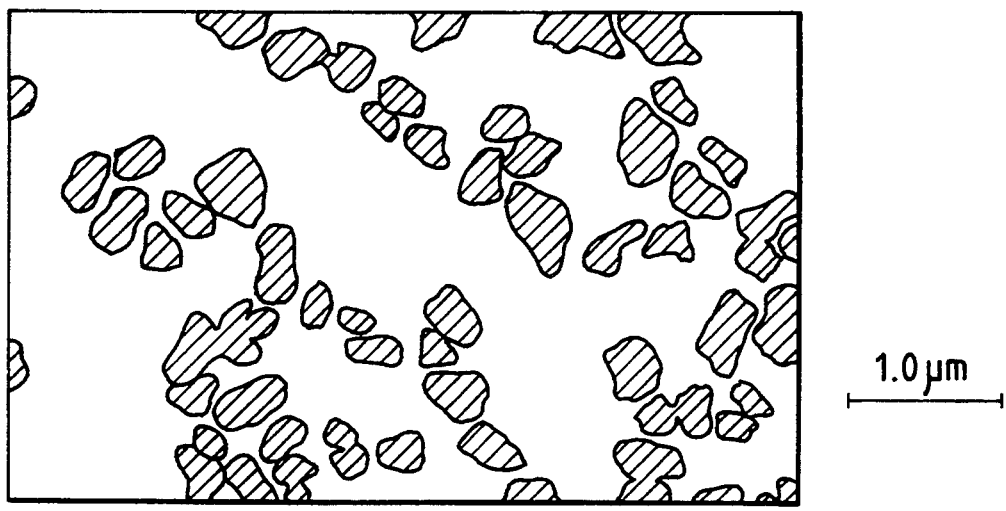
FIG. 6 is a schematic enlarged view of an abrasive powder consisting of primary particles.
Figure 7A:
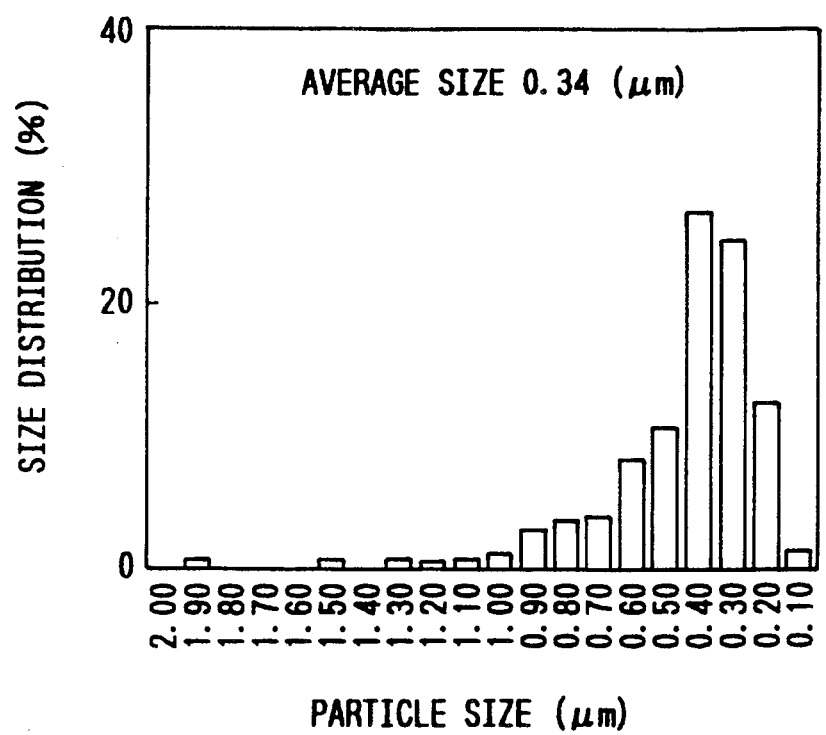
FIGS. 7a and 7b are, respectively, a size distribution and a cumulative frequency distribution curve of an alumina paste prepared in Comparative Example 1.
Figure 7B:
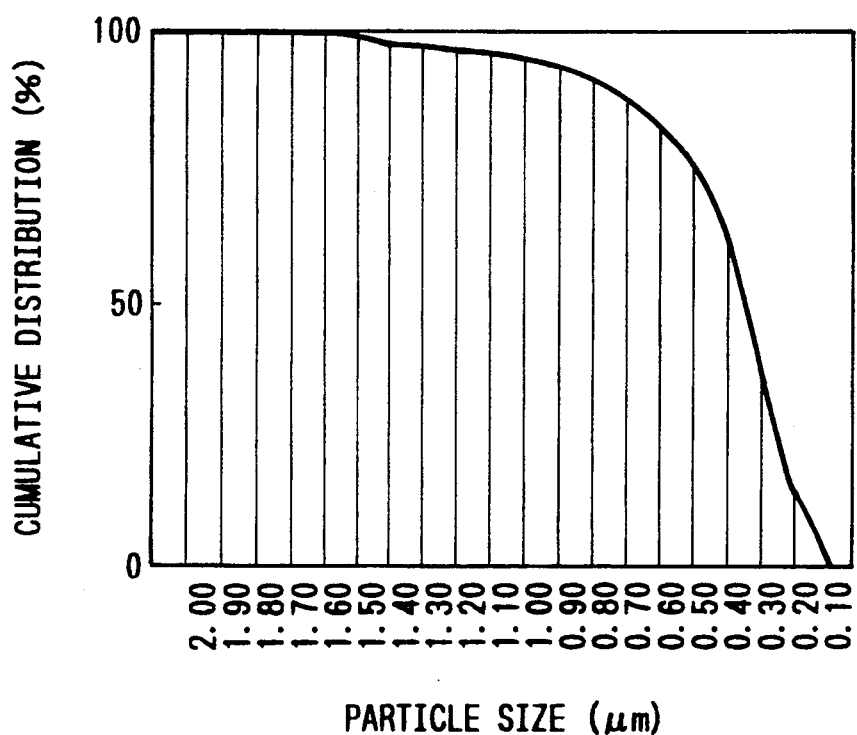
Figure 8A:
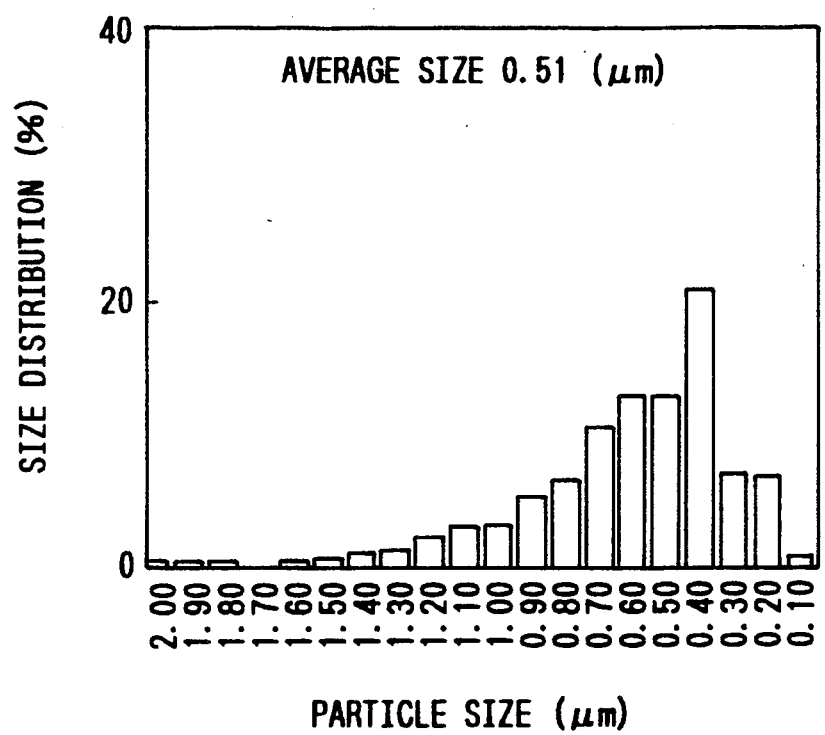
FIGS. 8a and 8b are, respectively, a size distribution and a cumulative frequency distribution curve of an alumina paste prepared in Comparative Example 2.
Figure 8B:
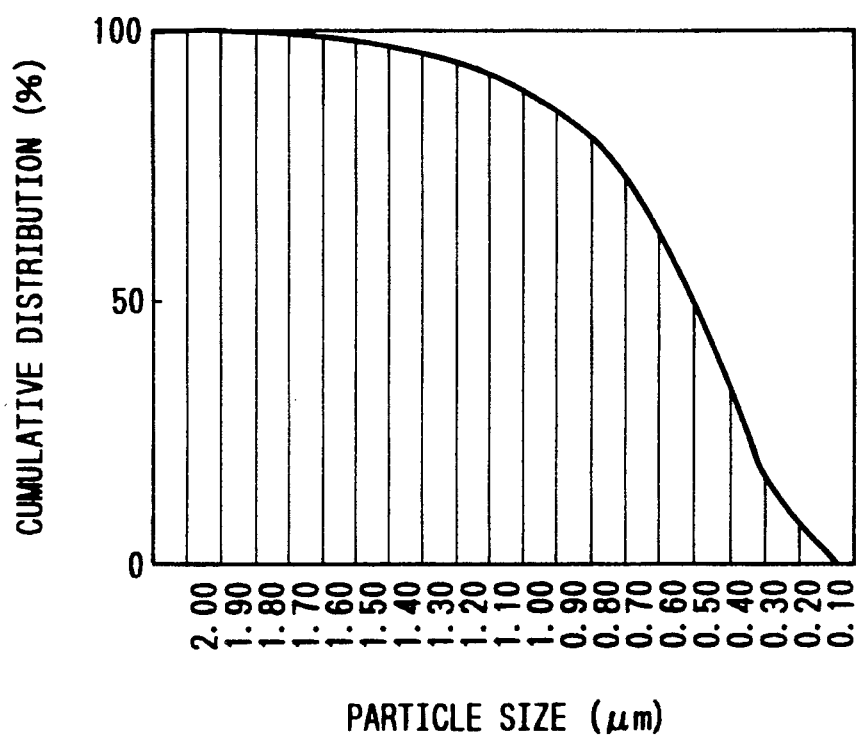

An important factor for controlling the durability of the magnetic recording medium is a surface roughness of the magnetic recording layer. In addition, a certain amount of an abrasive has to be present in the magnetic recording layer. Under conditions where the surface roughness is determined depending on the particle size of an abrasive powder, the amount of the abrasive powder necessary for the same level of the surface roughness depends on the shape of the powder. For instance, if used singly, primary particles of FIG. 6 which are more round-shaped than secondary particles of FIG. 5 having a more complicated arborescent or chain-like structure have to be used in larger amounts than the secondary particles. When the primary particles having a smaller size as shown in FIG. 6 are used in combination with the secondary particles having an arborescent or chain-like structure as shown in FIG. 5 in such a way that the former particles are at least partially included in or among the secondary particles, the total amount of the abrasive powders necessary for the film strength can be controlled at an appropriate level without a sacrifice of the surface roughness. For this purpose, the primary particles and the secondary particles should be contained at a ratio by weight of 8:2 to 2:8, preferably 6:4 to 4:6.

The present invention is described in more detail by way of examples.

EXAMPLE 1

A paste of the following formulation comprising alumina A having a primary particle structure with an average particle size of 0.4 $\mu m$ and alumina B having an arborescent or chain-like structure with an average particle size of 0.8 $\mu m$ was prepared by dispersion in a pebble mill for 72 hours.

| Alumina A | 25 parts by weight |
| Alumina B | 75 parts by weight |
| Polyurethane | 15 parts by weight |
| Methyl ethyl ketone | 30 parts by weight |
| Toluene | 30 parts by weight |
| Cyclohexanone | 10 parts by weight |

EXAMPLE 2

A paste of the following formulation comprising alumina A having a primary particle structure with an average particle size of 0.4 $\mu m$ and alumina B having an arborescent or chain-like structure with an average particle size of 0.8 $\mu m$ was prepared by dispersion in a pebble mill for 72 hours.

| Alumina A | 50 parts by weight |
| Alumina B | 50 parts by weight |

-continued

| | |
|---|---|
| Polyurethane | 15 parts by weight |
| Methyl ethyl ketone | 30 parts by weight |
| Toluene | 30 parts by weight |
| Cyclohexanone | 10 parts by weight |

EXAMPLE 3

A paste of the following formulation comprising alumina A having a primary particle structure with an average particle size of 0.4 μm and alumina B having an arborescent or chain-like structure with an average particle size of 0.8 μm was prepared by dispersion in a pebble mill for 72 hours.

| | |
|---|---|
| Alumina A | 75 parts by weight |
| Alumina B | 25 parts by weight |
| Polyurethane | 15 parts by weight |
| Methyl ethyl ketone | 30 parts by weight |
| Toluene | 30 parts by weight |
| Cyclohexanone | 10 parts by weight |

The alumina pastes obtained in Examples 1 to 3 were, respectively, used for preparing magnetic paints of the following composition containing a pure iron powder having a major axis of 0.3 μm, an axis ratio of 12 and a coercivity of 1470 Oe.

| | |
|---|---|
| Pure iron powder | 100 parts by weight |
| Carbon black | 7 parts by weight |
| Alumina paste | 20 parts by weight |
| Vinyl chloride-vinyl acetate copolymer | 15 parts by weight |
| Polyurethane | 15 parts by weight |
| Oleyl oleate | 13 parts by weight |
| Methyl ethyl ketone | 170 parts by weight |
| Toluene | 170 parts by weight |
| Cyclohexanone | 60 parts by weight |

Thereafter, 5 parts by weight of a polyfunctional isocyanate (Desmodule) were added, followed by uniform mixing and dispersion to obtain a magnetic paint.

Each paint was applied onto a 33 μm thick polyethylene terephthalate film in a dry thickness of 2.6 μm, rendered non-oriented under an AC magnetic field and dried by heating. The resulting magnetic sheet was subjected to super calendering and punched to obtain a two-inch disk. The disk was polished with a #10000 abrasive tape for 5 seconds to give a sample.

Comparative Example 1

A paste of the following formulation comprising alumina A having a primary particle structure with an average particle size of 0.4 μm was prepared by dispersion in a pebble mill for 72 hours.

| | |
|---|---|
| Alumina A | 100 parts by weight |
| Polyurethane | 15 parts by weight |
| Methyl ethyl ketone | 30 parts by weight |
| Toluene | 30 parts by weight |
| Cyclohexanone | 10 parts by weight |

Comparative Example 2

A paste of the following formulation comprising alumina A having an arborescent or chain-like structure with an average particle size of 0.8 μm was prepared by dispersion in a pebble mill for 72 hours.

| | |
|---|---|
| Alumina B | 100 parts by weight |
| Polyurethane | 15 parts by weight |
| Methyl ethyl ketone | 30 parts by weight |
| Toluene | 30 parts by weight |
| Cyclohexanone | 10 parts by weight |

Thereafter, the general procedure of Examples 1 to 3 was repeated using the paints obtained in these comparative examples, thereby obtain magnetic disk samples.

The alumina pastes obtained in Examples 1 to 3 and Comparative Examples 1 and 2 were each subjected to measurement of a size distribution by size distribution measuring instrument, CPPA 300, available from HORIBA Mfg. Co., Ltd. The size distributions of the pastes of Examples 1 to 3 are, respectively, shown in FIGS. 2a to 4a and the cumulative distributions are also shown in FIGS. 2b to 4b, respectively. Similarly, the size distributions and the cumulative distributions of the pastes obtained in Comparative Examples 1 and 2 are, respectively, shown in FIGS. 7a, 7b and 8a, 8b.

The magnetic disk samples were subjected to measurements of surface properties including gloss and surface roughness, an electromagnetic conversion characteristic and durability with the results shown in Tables 1 and 2.

The gloss was measured according to the method of JIS Z 8741. The surface roughness was determined by the use of a three-dimensional roughness tester available from WYKO Co., Ltd. The 2f output characteristic was determined at the innermost track 79 by means of JU-202 available from Matsushita Communication Ind. Co., Ltd. using a two inch floppy device, REF, available from Fuji Photo Co., Ltd.

TABLE 1

| Sample | Gloss 45–45° | Surface Roughness RMS (nm) | 2f Output (Track No. 79) Ref. (%) | Durability 50° C. 20% (×10⁴ cycles) |
|---|---|---|---|---|
| Example 1 | 178 | 9.0 | 109 | >2000 |
| Example 2 | 180 | 8.6 | 110 | >2000 |
| Example 3 | 183 | 6.9 | 112 | 1350 |

TABLE 2

| Sample | Gloss 45–45° | Surface Roughness RMS (nm) | 2f Output (Tr. 79) Ref. (%) | Durability 50° C. 20% (×10⁴ cycles) |
|---|---|---|---|---|
| Comp. Ex. 1 | 193 | 5.9 | 125 | 290 |
| Comp. Ex. 2 | 174 | 10.6 | 90 | >2000 |

The results of Examples 1 to 3 reveal that when alumina powders having the primary particle structure and the aborescent or chain-like structure are used in combination, the magnetic recording layer has an appropriate surface structure, so that the output characteristic and the durability of the magnetic recording mediums are excellent.

On the other hand, when the alumina powder having a primary particle structure is used singly as in Comparative Example 1, the surface roughness is so small that a high output is obtained but the durability is poor (Comparative Example 1). If the amount of the abrasive powder is increased in order to improve the durability, the durability may be improved to an extent but the packing density of the magnetic powder is lowered, with the possibility of lowering the electromagnetic conversion characteristic.

When the alumina powder having the secondary particle structure is used singly, the surface roughness becomes so great that the output is lowered although the durability is satisfactory (Comparative Example 2). In this case, the durability is good since the surface roughness of the sample is great. However, the output characteristic becomes low due to the space loss resulting from the coarse particles. Thus, there is a great possibility that there cannot be obtained satisfactory interchangeability of data. When the amount of the abrasive powder is reduced in order to improve the electromagnetic conversion characteristic, a slight improvement of the output may be expected. However, the strength of the magnetic film is lowered due to the reduced amount of the powder. This will lead to the medium which is liable to suffer defects on repetition of loading and unloading of the medium.

What is claimed is:

1. A magnetic recording medium which comprises a support and a magnetic layer formed on opposite sides of the support and comprised of a ferromagnetic fine powder and a non-magnetic powder of an abrasive both dispersed in a resin binder, said non-magnetic powder consisting essentially of a first alumina powder having an average particle size of from 0.01 to 1.0 μm and a second alumina powder having an arborescent structure and an average particle size of from 0.03 to 2.0 μm, the first and second alumina powders being present at a mixing ratio by weight of 8:2 to 2:8 wherein said first alumina powder has an average particle size smaller than said second alumina powder.

2. The magnetic recording media according to claim 1, wherein the total amount of the first and second alumina powders is in the range of from 5 to 25 wt % based on the ferromagnetic powder.

3. A disk-shaped magnetic recording medium which comprises:
a support;
a magnetic layer formed on opposite sides of said support and comprised of a ferromagnetic fine powder having a particle size ranging from 0.1 to 0.8 μm;
said magnetic layer further including a non-magnetic inorganic abrasive powder in an amount of 5 to 25 wt. % based on the ferromagnetic fine powder and having a Mohs hardness greater than 6 ;
said magnetic layer further including a resin binder, both of said ferromagnetic powder and said non-magnetic inorganic abrasive powder being dispersed in the resin binder, the total amount of said ferromagnetic fine powder and said non-magnetic inorganic abrasive powder being present in said resin binder ranging in an amount of from 180 to 250 wt. % based on the binder,
said non-magnetic inorganic abrasive powder consisting essentially of a first alumina powder having an average particle size of from 0.01 to 1.0 μm, and a second alumina powder having an arborescent structure and average particle size of from 0.03 to 2.0 μm, said first and second alumina powders being present at a mixing ratio by weight of 8:2 to 2:8.

* * * * *